Figure 3:
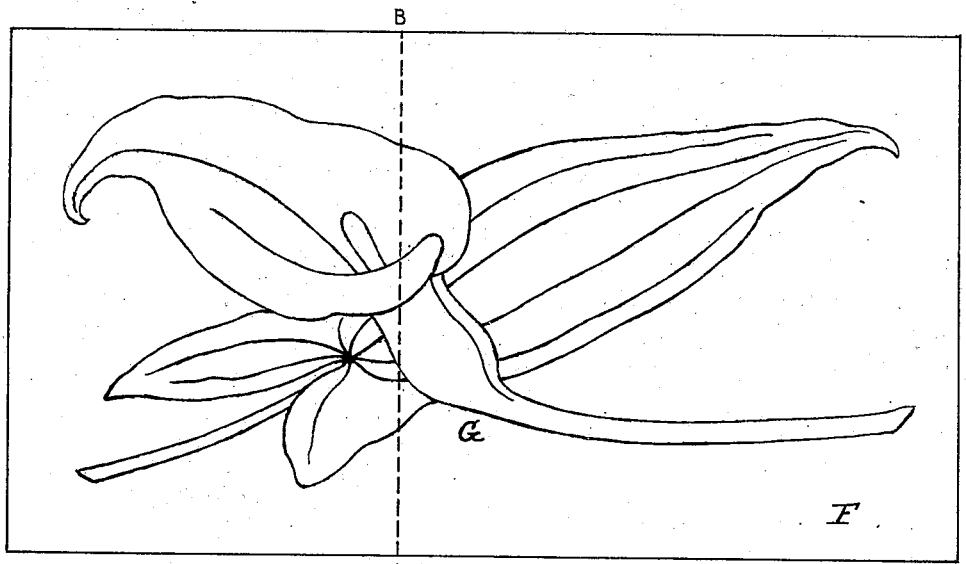

No. 710,106. Patented Sept. 30, 1902.
A. LEUCHTER.
PROCESS OF PRODUCING NEGATIVE PLATES FOR BICHROMATED GELATIN PROCESSES.
(Application filed July 20, 1901.)
(No Model.) 2 Sheets—Sheet 1.
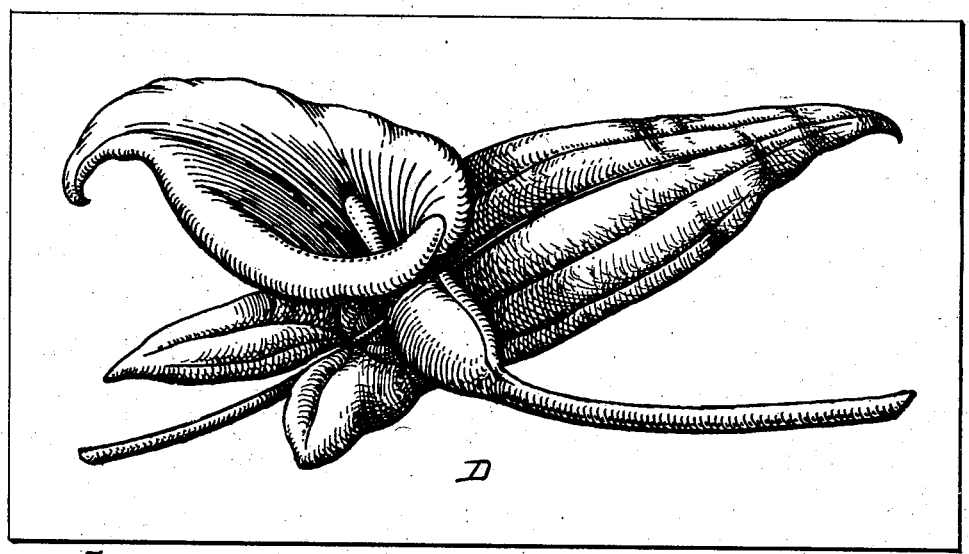
Fig. 1.
Fig. 2.
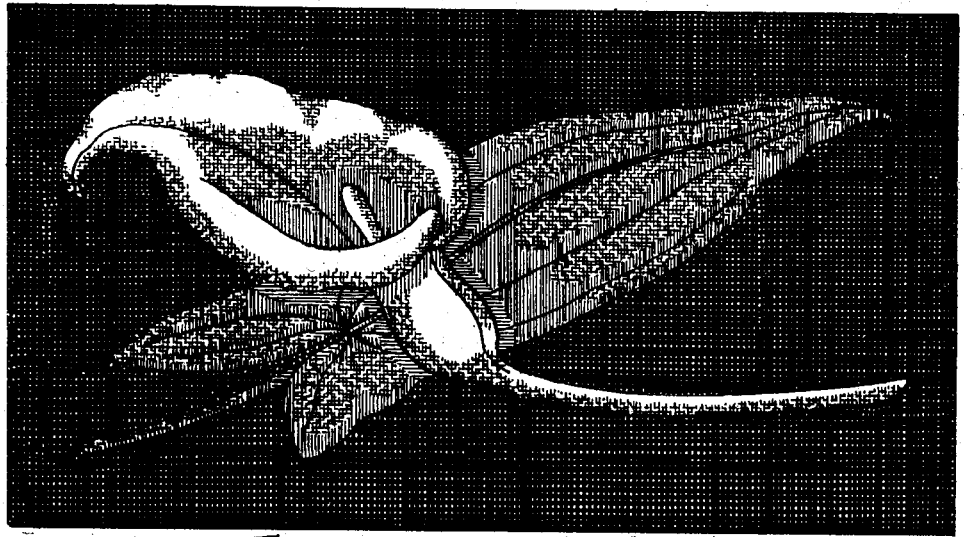
WITNESSES:
Edwin H. Dietrich.
Gunder Gunderson.
INVENTOR
August Leuchter,
BY
Chas. E. Gill
ATTORNEY No. 710,106. Patented Sept. 30, 1902.
A. LEUCHTER.
PROCESS OF PRODUCING NEGATIVE PLATES FOR BICHROMATED GELATIN PROCESSES.
(Application filed July 20, 1901.)
(No Model.) 2 Sheets—Sheet 2.

WITNESSES:
Edwin H. Dieterich.
Gundee Gunderson.

INVENTOR
August Leuchter,
BY
Chas. C. Gill
ATTORNEY

UNITED STATES PATENT OFFICE.

AUGUST LEUCHTER, OF BROOKLYN, NEW YORK.

PROCESS OF PRODUCING NEGATIVE PLATES FOR BICHROMATED-GELATIN PROCESSES.

SPECIFICATION forming part of Letters Patent No. 710,106, dated September 30, 1902.

Application filed July 20, 1901. Serial No. 69,043. (No specimens.)

*To all whom it may concern:*

Be it known that I, AUGUST LEUCHTER, a subject of the Emperor of Germany, and a resident of Brooklyn, in the county of Kings and State of New York, have invented certain new and useful Improvements in Processes of Producing Negative Plates for Bichromated-Gelatin Processes, of which the following is a specification.

The invention relates to the production of negative plates for bichromated-gelatin processes; and it consists in the novel processes hereinafter described and claimed.

My invention is based upon the principle that all colors do not reflect the rays of light equally and that inasmuch as the sensitive plate in the photographic camera is acted upon by the rays of light reflected from the object exposed by suitably coloring or shading the object photographed the negative produced by the reflected rays on the sensitive plate may be correspondingly modified and the resulting light and dark fields produced in varying degrees of intensity and the lights and shades distributed differently from their actual appearance on the object or even entirely eliminated.

In carrying out my invention according to a preferred method I produce a photographic negative of the object, picture, drawing, or representation to be reproduced and make a positive print therefrom and then color the features or parts of the positive print with colors of different reflecting potency, this print thus treated being termed by me a "neutral" print. The neutral print thus prepared is then photographed and the negative developed and fixed upon a transparent plate preparatory for its use in connection with the production of relief images or objects by means of the bichromated-gelatin process.

The processes heretofore known for producing relief images or objects by means of bichromated-gelatin process, as well as by the process for producing raised gelatin molds or plates for printing, are deficient and not suitable for producing correct reproductions of the objects in that they do not result in producing the reliefs in requisite graduations in the elevations and depressions of the features and also in that it is not possible by following the processes heretofore known to produce correct bas-reliefs of, for instance, a group of two or more persons or animals standing partly one behind the other and so that in the finished reproduction thereof the relative positions of the figures are brought out as they exist in fact.

The object of my invention is to remedy the foregoing defects in the processes heretofore known for producing negative plates for bichromated-gelatin processes.

The invention will be fully understood from the detailed description hereinafter presented, reference being had to the accompanying drawings, in which I illustrate as fully as can be done by a line-drawing the steps to be followed in the practice of my invention.

Figure 4:
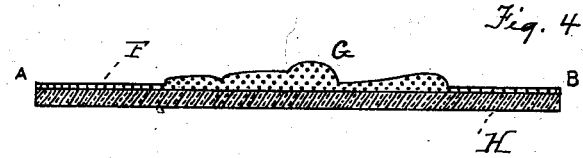
Figure 5:
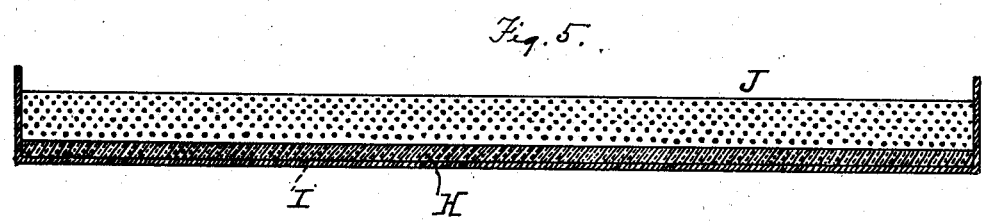

Figure 1 represents a photograph or picture of a flower; Fig. 2, a neutral print prepared therefrom in accordance with my invention, the colors on the flower being indicated and a solid black background being denoted; Fig. 3, a top view of the gelatin-plate with the raised figure indicated in outline; Fig. 4, a section on the line A B of Fig. 3 of the gelatin-plate resting on its glass plate; and Fig. 5, a longitudinal section, on an enlarged scale, of the sheet or foil receptacle with the glass plate and fresh gelatin therein.

In the drawings, D denotes the original photograph or picture; E, the neutral print; F, the dried-gelatin plate, having the figure G in relief; H, the glass plate; I, the foil-receptacle therefor, and J the gelatin on said plate when said gelatin is fresh or before it has become dry and reduced to form a plate.

With respect to their capacity for reflecting rays the colors may be ranged as follows: white, yellow, red, blue, and black, white being the most and black the least potent color to reflect rays. This is the main division of the colors, and different shades of each color, as light and dark yellow, light and dark red, light and dark blue, and the various combinations of colors produce intermediate grades between the several different colors.

The photograph of an object is a composition of the light or more illuminated and of the dark or less illuminated areas of the object. In the heretofore known so-called "bichromated-gelatin" or "swelled-gelatin" processes the negatives of photographs are utilized in producing plates for printing or mountings for embossed figures; but, as stated hereinbefore, the processes are defective because it is not possible to reproduce from such a negative a group of two or more objects showing correctly their relative position, as the intensity of the distributed areas of light and shades is the same in all and also because the colors of the parts of the object interfere with and prevent the production of a negative as required for a plastic relief. For instance, in the bust of a person the parts covered by clothing darker than the face, though, in fact, in higher plane than the face, will appear lighter in the negative, and consequently will not be produced by the gelatin process in their true elevation, and, again, parts covered with clothing lighter in color than the face, even if actually beneath the level thereof, will appear darker in the negative, and consequently higher in the gelatin-plate than they actually are.

In my improved process I proceed as follows: When making, for instance, a relief picture of two or more figures appearing in different planes, I make a photograph thereof and from the negative plate produce a print E, which I designate as "neutral." The figures appearing on this print of lights and shades in the same tones are colored or shaded according to my theory. The figures (or parts of a figure) appearing foremost and to be produced highest in the relief are colored, for instance, white, the receded parts indicated by shades being treated with tints of yellow or other suitable color, as the case may be, in the same manner as photographic negatives or pictures are retouched. The figure appearing in the next lower plane is colored yellow, the shades and depressions being tinted red or brown. The figures appearing in the next plane are colored red and the shades and depressions tinted darker brown. In the same manner I proceed in distinguishing the features of one figure, according to their position, or in distinguishing the figure from the background. The background of the figure is colored according to what it represents, and if plain then the color is preferably black. If the background represents an object—as, for instance, scenery—then I treat it in a similar manner as the figures, selecting for it, of course, correspondingly less reflective colors than those used on the figures. There is, however, not a fixed rule for the coloring. The color and the tint to be used are necessary to be determined in each individual case, according to the nature of the picture and the effect to be produced. When this neutral print E of the picture is painted or colored as described, it is again photographed and the negative plate made from this neutral print reproduces the effects of this coloring in lights and shades in such manner that all features of the picture will appear thereon in corresponding modulations of lights and shades as the varying reflecting potency of the different colors produce. Next I prepare a sensitive gelatin-plate of such thickness as necessary to produce the requisite dimensions in the height of the relief. The higher the relief required and the more graduations there are the thicker must be the sensitive gelatin-plate. It must, however, not be understood that a gelatin-plate of an excessive thickness is required. A high relief with clear graduations of three or more figures in different planes may be produced by means of a sensitive gelatin-plate one thirty-second of an inch thick. This dimension is for the plate when dry. When preparing such gelatin-plate, I take a smooth sheet of lead-foil I, place a glass plate H thereon, and turn the edges of the foil upwardly around the edges of the plate, thus forming a shallow pan of approximately three-eighths of an inch deep, into which the liquid gelatin is poured and allowed to dry. Such a plate is then set into a suitable frame, and after being covered with the negative plate, produced as above described, is exposed to light. The action of light upon the gelatin is well known. After exposing the gelatin-plate for a sufficient length of time to the action of light the negative plate is removed and the gelatin-plate is submerged in water. Except at the parts which were fully exposed to the undiminished force of the light, and thus rendered insoluble, the plate will absorb the water and swell. The swelling of the plate in different parts will vary in extent as the action of the light thereon was modified by passing through the prepared negative plate. The gelatin-plate when finally developed may be fixed in its swelled state, or a cast of plaster may be taken from it, and this cast may represent a mold into which metal may be cast for the reproduction of the relief. The bas-relief having been accurately formed, molds, patterns, dies, plates, and other means of reproduction may be made therefrom in accordance with known processes, requiring no special explanation herein. The same result may be obtained by my improved process from a photograph of an object, or a picture, painting, print, or pen-drawings. Paintings, colored prints, tapestry, and engravings may as well be reproduced in bas-relief by means of my improved process as natural objects or statuary, and even ordinary flat printing or line drawing of ornaments can be transformed by my process into bas-reliefs.

When my process is employed in connection with engravings, prints, and other representations not photographs, the engraving or picture will have the shading applied thereto as required and as above described and to produce a solid or full-tone effect before producing the photographic negative plate therefrom.

What I claim as my invention, and desire to secure by Letters Patent, is—

1. The process hereinbefore described of producing a negative plate for bichromated-gelatin process, consisting in producing a photographic negative of the object to be reproduced, making a positive print therefrom and coloring features thereof with colors of different reflecting potency, photographing the colored print, and then developing and fixing the negative thus produced upon a transparent plate.

2. The process described of producing a negative plate for bichromated-gelatin process, consisting in producing a photographic negative of the object to be reproduced, making a positive print therefrom and coloring features thereof with colors of different reflecting potency, coloring the background of the picture with color of less reflecting potency than that used on the features of the picture, photographing the colored print, and then developing and fixing the negative thus produced upon a transparent plate.

3. The process described of producing a negative plate for bichromated-gelatin process consisting in producing a photographic negative of the object to be reproduced, making a positive print therefrom and coloring the most prominent features in the picture with a color of high reflecting potency and successively coloring the less prominent features with colors of correspondingly less reflecting potency, photographing the colored print, and developing and fixing the negative thus produced upon a transparent plate.

4. The process described of producing a negative plate for bichromated-gelatin process, consisting in producing a photographic negative of the object to be reproduced, making a positive print therefrom and coloring the prominent features in the picture with a color of high reflecting potency, retouching the receded parts with tints of less reflecting potency, photographing the print thus colored, and developing and fixing the negative thus produced upon a transparent plate.

5. The process described of producing a negative plate for bichromated-gelatin process, consisting in producing a photographic negative of the object, to be reproduced, making a positive print therefrom, and coloring the more prominent features thereof with a color of high reflecting potency and the less prominent features with colors of correspondingly less reflecting potency, retouching the receded parts in each group of features with darker tints of the colors applied to the features of each group, photographing the colored print, and developing and fixing the negative thus produced.

6. The process described of producing a negative plate for bichromated-gelatin process consisting in producing a photographic negative of the object to be reproduced, making a positive print therefrom and coloring the more prominent features thereof with color of high reflecting potency and successively coloring the less prominent features with colors of correspondingly less reflecting potency, retouching the receded parts of the features of each successive group with darker tints of the color applied to the features in that group, coloring the background with a color of less reflecting potency than the color used upon more receded features of the object, photographing the colored print, and developing and fixing the negative thus produced.

7. The process described of producing a negative plate for bichromated-gelatin process, consisting in producing a photographic negative of the object to be reproduced, making a positive print therefrom and coloring the more prominent parts thereof with a color of high reflecting potency and the less prominent parts with colors of correspondingly less reflecting potency, retouching the receded parts of the features of each group with successively darker tints of the colors applied to the features in each group, coloring the background in a similar manner as the features of the picture with colors of correspondingly less reflecting potency than those used on the features of the more receded group, photographing the colored print, and developing and fixing the negative thus produced.

8. The process described of making a negative plate from a photograph, for purposes of reproduction, which consists in shading features of the photograph with colors of different reflecting potency as required, and producing a photographic negative plate of the picture thus prepared.

9. The process of producing a negative plate for bichromated-gelatin process from a pictorial representation, which consists in shading the features of the same with colors of different reflecting potency, as described, and producing a full-tone picture, and then producing a photographic negative plate from the picture thus prepared.

Signed at New York, in the county of New York and State of New York, this 19th day of July, A. D. 1901.

AUGUST LEUCHTER.

Witnesses:
  CHAS. C. GILL,
  HARVEY SPENCER.